United States Patent [19]

Prokai et al.

[11] 4,045,381
[45] Aug. 30, 1977

[54] ORGANOSILICONE POLYMERS

[75] Inventors: Bela Prokai, Mahopac; Bernard Kanner, West Nyack, both of N.Y.

[73] Assignee: Union Carbide Corporation, New York, N.Y.

[21] Appl. No.: 644,838

[22] Filed: Dec. 29, 1975

[51] Int. Cl.$^2$ .............................................. C08J 9/00
[52] U.S. Cl. ........................ 260/2.5 AH; 260/448.2 N
[58] Field of Search ................ 260/2.5 AH, 448.2 N

[56] References Cited

U.S. PATENT DOCUMENTS

| | | | |
|---|---|---|---|
| 3,541,127 | 11/1970 | Beattie et al. | 260/2.5 AH X |
| 3,563,924 | 2/1971 | Schwarz | 260/2.5 AH |
| 3,741,917 | 6/1973 | Morehouse | 260/2.5 AH |
| 3,846,462 | 11/1974 | Prokai et al. | 260/448.2 N |
| 3,905,924 | 9/1975 | Prokai | 260/448.2 N X |
| 3,966,784 | 6/1976 | Prokai | 260/448.2 N |

*Primary Examiner*—Lewis T. Jacobs
*Attorney, Agent, or Firm*—Reynold J. Finnegan

[57] ABSTRACT

Cyano-modified polysiloxane-polyoxyalkylene block copolymers that contain a trifunctional RSiO3/2 siloxy unit, as well as, a process for producing flexible polyether urethane foam wherein said copolymers are employed as the foam stabilizing component.

26 Claims, No Drawings

ORGANOSILICONE POLYMERS

BACKGROUND OF THE INVENTION

The present invention relates to novel organosilicone polymers and their use in the manufacture of urethane cellular products, particularly flexible polyether polyol-based urethane foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

Although certain techniques of urethane manufacutre such as the one-shot process and certain components of the foam formulation such as the polyisocyanates, amine catalyst and blowing agent, are generally useful, a specific problem associated with the production of a particular type of urethane foam and the solution thereto are often peculiar to the chemical and physical structure of the desired foamed product. In particular, the efficacy of the foam stabilizer is usually selective with respect to the formation of a particular type of foam. One factor to be considered in the evaluation of stabilizing efficacy is surfactant potency which is reflected by two types of measurements. One is the measured original height to which the foam rises as it is being formed. From this standpoint, the greater the foam rise, the more potent is the surfactant. The second potency measurement is concerned with the ability of the surfactant to maintain the original height of the foam once it has formed. Foams produced with surfactants which have good potency in this second request undergo a minimum of settling or "top collapse" which may otherwise contribute to split formation and other foam defects.

It is also desirable that the foam stabilizer have good processing latitude, that is, ability to provide foams of satisfactory quality over a relatively wide range of operating variables such as, for example, concentration of surfactant and metal co-catalysts which are normally employed in the manufacture of flexible polyether-based foams. The more common co-catalysts are organic derivatives of tin and thus sensitivity to variation in co-catalyst concentration is more particularly referred to in the art as "tin operating latitude." Decreasing the concentration of such co-catalysts below normal levels is sometimes necessary to improve breathability of the foam but, if the effectiveness of the foam stabilizer is narrowly dependent on co-catalyst concentration (that is, its tin operating latitude is poor), the desired enhanced breathability may be offset by foam weakness due to split formation.

The search for improved surfactants for stabilization of polyurethane foams is further complicated by the tendency of such foams to ignite readily and burn and the need to reduce their flammability This characteristic is particularly objectionable in the case of flexible polyurethane foams in view of the use of such foams in many applications where fire is especially hazardous such as their use in automotive seat cushions and household furniture cushioning. One approach to reducing flammability of flexible foams is to include a flame-retarding agent such as various phosphorus and/or halogen-containing compounds as a component of the foam-producing reaction mixture. It is found, however, that surfactants which may otherwise be effective stabilizers of non flame-retarded foams, may be deficient as stabilizers of foams containing a flame retardant. It is also desirable that the siloxane surfactant possess a good combination of potency and processing latitude in the stabilization of flexible polyether urethane foams. Thus, there is still room in the art for improved organosilicone foam stabilizers.

Accordingly, it is an object of this invention to provide new and useful organosilicone polymers which have particular application in the manufacture of flexible polyether polyol-based polyurethane foams. It is another object of this invention to provide a novel process for producing flexible polyether polyurethane foam using said organosilicone polymers as the foam stabilizer. A further object is to provide flexible polyether polyurethane foams produced by said porcess. Various other objects and advantages of this invention will become readily apparent from the following description and appended claims.

SUMMARY OF THE INVENTION

More particularly the novel organosilicone polymers of this invention are polysiloxane-polyoxyalkylene block copolymers which may be represented as having the following empirical average formula $$[RSiO_{3/2}]_t(R_2SiO)_w(R(R^1)SiO)_z[(C_nH_{2n}O)_pR^2]_v \tag{I}$$

wherein:
R represents a monovalent hydrocarbon radical having from 1 to 10 carbon atoms;
$R^1$ represents a cyano-substituted radical of the formula —$(O)_aR^3CN$ wherein $R^3$ is a bivalent alkylene radical having from 2 to 6 carbon atoms or a bivalent alkyleneoxyalkylene radical having from 4 to 12 carbon atoms, and $a$ has a value of 0 or 1;
$R^2$ is a monovalent hydrocarbon radical having from 1 to 12 carbon atoms;
$t$ has an average value of about 0.8 to about 4, preferably about 0.8 to about 2;
$w$ has an average value of about 3 to about 100, preferably about 9 to 40;
$z$ has an average value of about 3 to about 20, preferably about 3 to 15;
$n$ has a value of from 2 to 4 provided that about 20 to about 65 weight percent of the oxyalkylene units of the polyoxyalkylene chain, $(C_nH_{2n}O)_p$, is constituted of oxyethylene units;
$p$ has an average value such that the average molecular weight of the polyoxyalkylene chain is from about 800 to about 6000, and is preferably no more than about 4,000; and
$v$ has an average value of from about 2 to about 4.

In addition to the aforesaid novel class of organosilicone polymers, the present invention also provides a process for producing flexible polyether polyurethane foam which comprises reacting and foaming a reaction mixture of: (a) a polyether polyol reactant containing an average of at least two hydroxyl groups per molecule; (b) a polyisocyanate reactant containing at least two isocyanato groups per molecule; (c) a blowing agent; (d) a catalyst comprising an amine; (e) a co-catalyst comprising an organic derivative of a polyvalent metal such as tin; and (f) a foam stabilizer comprising the novel polysiloxane-polyoxyalkylene block copolymers of this invention. In addition to their efficacy as stabilizers of polyether-based urethane foams, it has been found that the organosilicone polymers of this invention possess the further advantageous property of allowing for the formation of flame-retarded foams containing a flame retardant of acceptable overall quality. In accordance with this aspect of the present invention, flexible polyether-based urethane foams containing a flame retardant agent are provided by reacting and foaming reaction mixtures which also include a silicon-free, flame-retardant agent.

In providing either the foams that are free of a flame retardant agent or the foams containing a flame retardant agent, the organo-silicone polymers encompassed by Formula I above can be introduced to the foam-producing reaction mixtures either as such, in diluted form or preblended with one or more of the polyether polyol reactant, blowing agent, amine catalyst or flame retardant agent.

DESCRIPTION OF THE PREFERRED EMBODIMENTS

The organosilicone polymer surfactants of this invention, as depicted by Formula I above, are polysiloxane-polyoxyalkylene block copolymers wherein the polysiloxane and polyoxyalkylene blocks are linked through a silicon-to-oxygen bond. Thus from the standpoint of the nature of the linkage by which said blocks are joined, the copolymers of Formula I are hydrolyzable. Although the monovalent hydrocarbon groups represented by R are bonded to silicon through Si-C linkages, the cyano-substituted groups, $R^1$, may be bonded to silicon through either a silicon-to-carbon bond, $-R^3CN$, or a silicon-to-oxygen bond $-O-R^3-CN$. Thus, the organosilicone polymers of this invention may be (1) hydrolyzable with respect to both the polyoxyalkylene block and cyano-substituted groups, or as is more preferred (2) hydrolyzable with respect to the polyoxyalkylene block and non-hydrolyzable with respect to the cyano-substituted groups (i.e., Si-$R^3$-CN).

The monovalent hydrocarbon groups (R of Formula I above) may contain from 1 to 10 carbon atoms and may be alkyl, aryl, e.g. phenyl, alkenyl, aralkyl radicals and the like. Preferably R represents an alkyl radical, including linear and branched chain radicals, such as methyl, ethyl, n-propyl, isopropyl, n-butyl, t-butyl, pentyl, hexyl, octyl, and decyl groups. More preferred are the lower alkyl radicals (that is, those having from one to four carbon atoms of which methyl is especially preferred.) It is to be understood that the R groups may be the same throughout the polymer or they may differ as between or within units without departing from the scope of this invention.

In the silicon-bonded, cyano-substituted groups of Formula I above, when $a$ is 0, $R^1$ is -$R^3$CN and when $n$ is one, $R^1$ is —O-$R^3$CN where $R^3$ represents a bivalent alkylene radical including linear and branched radicals of the series —$C_cH_{2c}$— or bivalent alkyleneoxyalkylene radicals incuding linear and branched radicals of the series —$C_cH_{2c}$-O-$C_cH_{2c}$- where $c$ has a value of from 2 to 6. Illustrative of suitable groups represented by $R^3$ are ethylene, —$CH_2CH_2$—; propylene or trimethylene, (-$CH_2CH_2CH_2$-); isopropylene, [-$CH_2CH(CH_3)$-]; tetramethylene and higher homologues to hexamethylene [-($CH_2)_6$-], as well as ethylene-oxyethylene )-$CH_2CH_2OCH_2CH_2$-); propyleneoxyethylene [-($CH_2)_3O(CH_2)_2$-]; and higher alkyleneoxyalkylene homologues to [-($CH_2)_6O(CH_2)_6$-]. Preferably $a$ has a value of zero and the $R^3$ groups are usually lower alkylene groups having from two to four carbon atoms or lower alkyleneoxyalkylene groups having from four to eight carbons atoms. More preferably $R^3$ is a lower alkylene radical, especially propylene, (-$CH_2CH_2CH_2$-). It is to be understood that the cyano-substituted $R^1$ groups may be the same or different throughout the polymer and that the polymer may contain any combination of cyanoalkyl (NC-$R^3$-) and cyanoalkyoxy (NC-$R^3$-O-) substituted siloxy units. Likewise, it is understood that the polymers can contain any combination of cyano-substituted groups wherein $R^3$ of said groups are the same of different.

The average molecular weight of the polyoxyalkylene chain represented by —$(C_nH_{2n}O)_p$- in Formula I above, ranges from about 800 to about 6000 and from about 20 to about 65 weight percent thereof is constituted of oxyethylene units. The remainder of the polyoxyalkylene chain is usually formed of oxypropylene, oxybutylene or a combination of such units, although preferably the remainder is oxypropylene. The preferred polyoxyalkylene blocks of the polymer of Formula I above have the formula, $R^2O(C_3H_6O)_y(C_2H_4O)_x$- wherein $x$ and $y$ have average values such that the average molecular weight of the polyoxyalkylene chain —$(C_3H_6O)_y(C_2H_4O)_x$— is within the aforesaid range of 800 to 6000, and from 20 to 65 weight percent of the polyoxyalkylene chain is constituted of oxyethylene units. It is of course, understood that the oxyethylene and other oxyalkylene units can be randomly distributed throughout the polyoxyalkylene chain such as when a mixture of alkylene oxides is polymerized or they can be arranged in respective sub-blocks such as when the respective alkylene oxides are polymerized sequentially, provided the total average content of —($C_2H_4O$)— in the chain is within the aforesaid range. Accordingly the formulas employed herein to represent said polyoxyalkylene chains and polyoxyalkylene blocks are intended to encompass both such types of polyoxyalkylene chains and are not to be interpreted as merely being specifically directed to one of either of the two aforesaid types of oxyalkylene arrangements. It is of course to be further understood that the organosilicone polymers of this invention can contain polyoxyalkylene chains of basically one type, e.g. a polyoxyalkylene chain having essentially one average molecular weight or contain an admixture of two or more polyoxyalkylene chains, e.g. a polyoxyalkylene chain having a low average molecular weight and a polyoxyalkylene chain having a high average molecular weight.

Thus, a preferred embodiment of the polymers encompassed by Formula I are those wherein the polyoxyalkylene block, —$(OC_nH_{2n})_pOR^2$ is comprised of an admixture of Units X and Y of the formula, $R^2O(C_3H_6O)_y(C_2H_4O)_x$— wherein $x$ and $y$ are determined by the following conditions prevailing for Units X and Y:

Unit X represents from about 50 to about 95 weight percent, based on the total weight of Units X and Y in said admixture thereof, of low molecular weight poly(oxyethyleneoxypropylene) copolymers having an average molecular weight from about 800 to about 3000 and wherein from about 20 to about 65 weight percent of the oxyalkylene groups are oxyethylene, the remainer of the oxyalkylene groups being oxypropylene;

Unit Y represents from about 50 to about 5 weight percent, based on the total weight of Units X and Y in said admixture thereof, of a higher molecular weight poly(oxyethylene-oxypropylene) copolymer having an average molecular weight from about 1600 to about 6000 and wherein from about 20 to about 65 weight percent of the oxyalkylene groups are oxyethylene, the remainder of the oxyalkylene groups being oxypropylene; provided the said admixture of Units X and Y has an average molecular weight no higher than about 6000.

In a further preferred embodiment of said admixture of Units X and Y, Unit X represents from about 60 to about 90 weight percent of low molecular weight poly(oxyethylene-oxypropylene) copolymer having an average molecular weight from about 1400 to about 2500, and Unit Y constitutes from about 40 to about 10 weight percent of higher molecular weight poly(oxyethylene-oxypropylene) copolymers having an average molecular weight from about 2500 to about 3500, and the average molecular weight of the admixture is no higher than about 4000, the oxyethylene content of respective Units X and Y being as aforesaid. Most preferably, the average molecular weight of Unit X is no higher than about 2200. The most preferred polyoxyalkylene block admixture consists essentially of about 78 percent by weight of $C_4H_9O(C_2H_4O)_{18.4}(C_3H_6O)_{14}$— and about 22 percent by weight of $C_4H_9(C_2H_4O)_{32.1}(C_3H_6O)_{24.3}$—.

As further indicated by the above Formula I, the polyoxyalkylene chain, $-(C_nH_{2n}O)_p-$, is terminated by $R^2$ which represents a monovalent hydrocarbon radical having from 1 to 12 carbon atoms and is usually free of aliphatic unsaturation. Illustrative of such $R^2$ radicals are alkyl groups including linear and branched chain alkyl groups having the formula, $C_fH_{2f+1}-$, wherein $f$ is an integer from 1 to 12, such as, for example, methyl, ethyl, n-propyl, isopropyl, n-butyl, octyl and dodecyl groups; a cycloaliphatic radical including monocylic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, betal-phenylethyl and 2-phenylpropyl groups; alkyl- and aryl- substituted cycloaliphatic radicals such as, for example, methylcylopentyl and phenylcyclohexyl radicals; and the like. It is evident, therefore, that the polyoxyalkylene chain is end-blocked with a terminal ($-OR^2$) group which can be an alkoxy, aryloxy, aralkoxy, alkaryloxy, or cycloalkoxy group. It is to be understood that the terminal group of the respective polyoxyalkylene blocks of the polymers of this invention may be the same throughout the polymer or may differ.

the generally preferred $R^2$ groups are phenyl, lower alkyl radicals, the lower alkyl-substituted aryl groups and the aryl-substituted lower alkyl groups, wherein the term "lower alkyl" denotes $C_1$-$C_4$ alkyl radicals. Therefore, illustrative of the preferred capping groups represented by $R^2$ of Formula I are: methyl, ethyl, propyl, butyl, phenyl, benzyl, phenylethyl, ($C_6H_5$-$C_2H_4-$), and the like. Most preferably $R^2$ is a lower alkyl group, especially n-butyl.

Further illustrative of the most preferred organosilicone polymers of this invention are those encompassed by the following empirical average formula

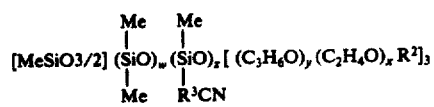

wherein Me is methyl; $w$ has an average value of from about 3 to 100, preferably about 9 to 40; $z$ has an average value of about 3 to 20 preferably about 3 to 15; wherein $x$ and $y$ have average values such that the average molecular weight of the polyoxyalkylene chain is within the range of about 800 to 6000, preferably about 1000 to 4000, and from about 20 to about 65 weight percent of the polyoxyalkylene chain is constituted of oxyethylene; and $R^2$ and $R^3$ are the same as defined above, the preferred values of the polyoxyalkylene chain, $R^2$ and $R^3$ also being the same as defined above.

It is, of course, to be understood that the class of polymers depicted by the above Formulas (I) and (II) also comprise polymers containing residual silicon-bonded alkoxy groups (Si-OR$^4$, where R$^4$ is alkyl of 1 to 10 carbon atoms, usually ethyl) derived from the monovalent hydrocarbontrialkoxysilanes (e.g. $CH_3Si(OC_2H_5)_3$) employed in their preparation, and that R of such residual alkoxy may satisfy oxygen of the trifunctional and/or difunctional siloxy units. Further, while the polysiloxane-polyoxyalkylene block copolymers of this invention can be discrete chemical compounds, normally they are mixtures of various discrete block copolymeric species due at least in part to the manner in which they are made and the fact that the siloxane and polyoxyalkylene reactants used to prepare said copolymers are themselves usually mixtures. Thus consistent with convention in the art to which this invention pertains, the formulas of the polymers indicate their overall average composition rather than any particular ordered arrangement of units or molecular weight of any particular polymer species.

The organosilicone polymers of this invention can be easily prepared by a two-step process involving the preparation of cyano-modified, alkoxy end blocked siloxane intermediate fluid by base-catalyzed equilibration of trialkoxysilane, e.g. R-Si(OR$^4$)$_3$, or its partially hydrolyzed derivative, di-monovalent hydrocarbon depolymerizate, e.g. (R$_2$SiO) cyclics, and cyano-modified cyclics, e.g. [R(R$^1$)SiO] cyclics or cyano-modified mixed cyclics, e.g. [(R$_2$SiO)$_3$(R(R$^1$)SiO)], followed by transesterification of the cyano-modified alkoxy end blocked siloxane intermediate fluids and various hydroxyl terminated polyethers, e.g. R$^2$(OC$_n$H$_{2n}$)$_p$OH, to produce the desired organosilicone polymes of this invention. The overall synthesis is outlined below.

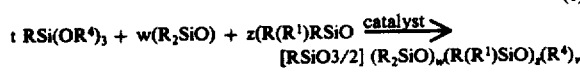

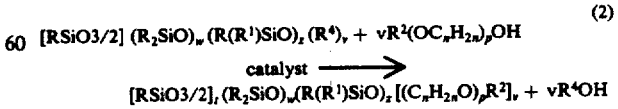

wherein R, R$^1$, R$^2$, R$^4$, (OC$_n$H$_{2n}$)$_p$ $t$, $w$, $z$ and $v$ are defined above.

The polymerization catalyst employed in the conventional equilibration process to produce the cyano-modified, alkoxy end blocked siloxane intermediate fluids is preferably tetramethyl ammonium silanolate, although other basic catalysts such as potassium silanolate or cesium hydroxide or mixtures thereof will give siloxane intermediate fluids under suitable conditions. The temperature at which the equilibrations are carried out depends on the catalyst employed. With tetramethyl ammonium silanolate a temperature of about 90° C is normally sufficient and the catalyst is usually employed in concentration of about 80 to about 150 parts per million as potassium equivalent (one drop of tetramethylammonium silanolate is equivalent to about 4.57 ppm as K). After the equilibration process is over as indicated by vapor phase chromatographic analysis the reaction mixture product is heated to about 150° C., and held there for at least 2 hours to insure deactivation of the catalyst. The siloxane intermediate fluids are then generally filtered through a medium glass-fitted funnel to give clear straw colored fluids.

The desired organosilicone polymers of this invention are then readily prepared from the corresponding siloxane intermediate fluids and hydroxyl terminated polyethers, using conventional transesterification procedures. The transesterification process is preferably carried out in the presence of trifluoro acetic acid/potassium acetate catalyst and toluene as the solvent although other catalysts and solvents may be used if desired. The temperature of the reaction process is preferably in the range of from about 60° C. to about 150° C. At temperatures below this range the condensation reaction proceeds at a slow rate or not at all.

The transesterification reaction shown in Equation (2) above requires the removal of the alcoholic by-product, R$^4$OH. The ultimate quantity of said alcoholic by-product removed from each reaction mixture provides an indication of the extent to which that particular condensation reaction between the siloxane and the polyetherol reactants has reached completion. Additionally, the rate at which the alcoholic by-product is removed serves to indicate the rate at which the reaction is progressing.

The removal or neutralization of the acid catalyst employed in the transesterification reaction is also desirable to provide a stable block copolymer product. The degradation of siloxane-oxyalkylene block copolymers in the presence of strong acids and bases are well known. Neutralization of the acid catalyst can be easily accomplished by conventional methods such as by the addition of sodium bicarbonate followed by filtration to recover the desired organosilicone polymers of this invention.

Catalysts that may be employed in the transesterification process are, in general, the carboxylic acids, including trifluoroacetic acid, prefluorobutyric acid, monochloroacetic acid, acetic acid, Group 1A metal carboxylates of the same acids, and mixtures thereof. The catalysts are active with most starting materials and may be effective in low concentrations, e.g. as low as 0.1 percent based on the weight of the starting materials, although the catalyst is usually employed in a concentration of from about 0.1 to about one weight percent based on the weight of the starting materials.

The starting materials and/or methods for their preparation used in the above equilibration and transesterification processes to produce the desired organosilicone polymers of this invention are well known in the art and need not be further detailed since the particular starting materials involved, as well as the mole ratios of said starting materials used, in a given process will merely depend upon the polysiloxane-polyoxyalkylene block copolymer product of this invention that is desired to be produced. Moreover, optimization of the reaction conditions of said processes as further taught herein is well within the capabilities of even one of average skill in the art.

Another aspect of this invention relates to the use of the organosilicone polymers of this invention as surfactant foam stabilizers in the process for producing flexible polyether polyurethane foam. The above-described polysiloxane-polyoxyalkylene block copolymers of this invention can be so employed as a 100 percent active stream or in dilute form as a solution in various types or organic liquids including polar and non polar solvents. For example, the copolymers may be diluted with non polar solvents such as the normally liquid aliphatic and aromatic unsubstituted and halogen-substituted hydrocarbons such as heptane, xylene, toluene, chlorobenzene and the like. When used, the preferred diluents ar polyxoyalkylene compounds encompassed by the formula:

wherein:
Z is hydrogen or a monovalent hydrocarbon group including alkyl (e.g., methyl, ethyl, propyl and butyl), aryl (e.g., phenyl and tolyl) and aralkyl (e.g., benzyl) groups;
Z' is a bivalent alkylene group (e.g., ethylene, propylene, trimethylene and butylene);
Z" is a monovalent hydrocarbon group such as defined for Z; and
t has an average value of at least two.

When Z is hydrogen, it is preferred that such ZO groups (that is, —OH) represent no more than about 5 weight percent of the solvent. Suitable solvents are alkylene oxide adducts of starters such as water, monools, diols and other polyols. Such organic starters are typically illustrated by butanol, propylene glycol, glycerol and 1,2,6-hexantriol. Preferred adducts of the organic starters are the mixed alkylene oxide adducts, particularly those containing a combination of oxyethylene and oxypropylene units. For example, one class of such organic solvents which may be present in combination with polysiloxane-polyoxyalkylene copolymers of the present invention are mixed ethylene oxide-propylene oxide adducts of butanol which are represented by the general formula, HO(C$_2$H$_4$O)$_s$(C$_3$H$_6$O)$_u$C$_4$H$_9$, wherein s has an average value from about 8 to about 50, and u has an average value from about 6 to about 40. Preferably the values of s and u are such that the weight percent of oxyethylene units is about equal to the weight percent of the oxypropylene units.

When used, the aforesaid diluents are usually present in an amount from about 1 to about 60 weight percent based on the weight of the polysiloxane-polyoxyalkylene copolymer in the resulting solution. More usually, when such diluents are present, they are contained in the solution in an amount from about 5 to about 45 weight percent, again based on the weight of the organosilicone polymer contained therein. It is to be understood, however, that such solutions may have higher contents of diluent and that the extent of dilution, if any, depends largely on the activity specifications of any given foam formulation.

The organosilicone polymers of the present invention may also be used in combination with non ionic organic surfactants such as adducts produced by reacting $k$ moles of ethylene oxide (wherein $k$ has an average value from about 4 to about 40, inclusive of whole and fractional numbers) per mole of any of the following hydrophobes: n-undecyl alcohol, myristyl alcohol, lauryl alcohol, trimethyl nonanol, tridecyl alcohol, pentadecyl alcohol, cetyl alcohol, nonylphenol, dodecylphenol, tetradecylphenol and the like. Especially useful are ethylene oxide adducts of nonylphenol having the average composition, $C_9H_{19}-C_6H_4-(OC_2H_4)_hOH$, wherein $h$ has an average value from about 9 up to about 20 or more, including whole and fractional numbers such as 9, 10.5, 13, 14.5 and 15. When used, such non ionic organic surfactants are used in amounts from about 2 to about 20 weight percent, based on the weight of the organosilicone polymer in any given solution.

In addition to the organosilicone polymer surfactant foam stabilizers of this invention, the other essential types of components and reactants employed in providing flexible polyether polyurethane foams as described herein are polyether polyols, organic polyisocyanates, the catalyst system and blowing agent. The foam-producing reaction mixture can also contain a flame-retardant. The organosilicone polymers of the present invention are usually present in the final foam-producing reaction mixtures in amounts of from about 0.1 to about 5 parts by weight and preferably from about 0.2 to about 2 parts by weight per 100 parts by weight of the polyether polyol reactant.

In producing the flexible polyurethane polymers of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Among suitable polyether polyols that can be employed are the poly(oxyalkylene) polyols, that is, alkylene oxide adducts of water or polyhydric organic compound as the initiator or starter. For convenience, this class of polyether polyols is referred to herein as Polyol I. Illustrative of suitable polyhydric organic initiators are any one of the following which may be employed individually or in combination: ethylene glycol; diethylene glycol; propylene glycol; 1,5-pentanediol; hexylene glycol; dipropylene glycol; trimethylene glycol; 1,2-cyclohexanediol; 3-cyclohexane-1, 1-dimethanol and dibromo-derivative thereof; glycerol; 1,2,6-hexanetriol 1,1,1-trimethylolethane; 1,1,1-trimethyolpropane; 3(2-hydroxyethoxy)- and 3-(2-hydroxyl propoxy)-1 2-propanediols; 2,4-dimethyl-2-(2-hydroxyethoxy)methylpentanediol-1,5; 1,1,1,-tris[(2-hydroxyethoxy)methyl]ethane; 1,1,1-tris[(2-hydroxypropoxy)methyl]propane; pentaerythritol; sorbitol; sucrose; alpha-methyl glucoside; other such polyhydric compounds consisting of carbon, hydrogen and oxygen and having usually not more than about 15 carbon atoms per molecule; and lower alkylene oxide adducts of any of the aforesaid initiators such as propylene oxide or ethylene oxide adducts having a relatively low average molecular weight up to about 800.

The above-described polyether polyols are normally liquid materials and, in general, are prepared in accordance with well known techniques comprising the reaction of the polyhydric starter and an alkylene oxide in the presence of an oxyalkylation catalyst which is usually an alkali metal hydroxide such as, in particular potassium hydroxide. The oxyalkylation of the polyhydric initiator is carried out at temperatures ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = (56.1 \times 1000 \times f)/M.W.)$$

wherein

OH = hydroxyl number of the polyol, f = average functionality, that is, the average number of hydroxyl groups per molecules of polyol, and M.W. = average molecular weight of the polyol.

The alkylene oxides usually employed in providing the polyether polyol reactants are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyether polyols that are suitable for use in preparing the flexible polyurethane foams of the present invention are polymer/polyether polyols which, for convenience, are referred to herein as Polyol II. Such reactants are produced by polymerizing one or more ethylenically unsaturated monomers dissolved or dispersed in a polyether polyol in the presence of a free radical catalyst. Suitable polyether polyols for producing such compositions include, for example, any of the above-described polyols encompassed by the definition of Polyol I. Illustrative of suitable ethylenically unsaturated monomers are those encompassed by the general formula,

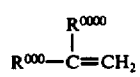

wherein: R°°° is hydrogen, methyl or any of the halogens (i.e., fluorine, chlorine, bromine or iodine); and R°°°° is R°°°, cyano, phenyl, methyl-substituted phenyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstryene, and butadiene. These and other polymer/polyol compositions which are suitably employed either individually or in combination with Polyol I are those described in British Pat. 1,063,222 and U.S. Pat. No. 3,383,351, the disclosures of which are incorporated herein by reference thereto. Such compositions are prepared by polymerizing the monomers in the polyol at a temperature between about 40° C. and about 150° C. employing any free radical-generating initiator including peroxides, persulfates, percarbonates, perborates, azo compounds such as, for example, hydrogen peroxide, dibenzoyl peroxide, benzoyl hydroperoxide, lauroyl peroxide, and azobis(isobutyronitrile). The polymer/polyether polyol product may also contain a small amount of unreacted polyether, monomer and free polymer.

When used in the practice of this invention, the polymer/polyol compositions usually contain from about 5 to about 50, and more usually from about 10 to about 40, weight percent of the ethylenically unsaturated monomer polymerized in the polyether polyol. Especially suitable polymer/polyols are those containing:

(A) from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of (1) and (2), respectively; and (B) from about 90 to about 70 weight percent of the polyether polyol, and particularly trifunctional polyols such as alkylene oxide adducts of glycerol.

In preparing polyurethane foams in accordance with the present invention, it is to be understood that mixtures of any of the aforesaid polyether polyols encompassed by Polyol I and Polyol II can be employed as reactants with the organic polyisocyanate. The particular polyether polyol or polyols employed depends upon the end-use of the polyurethane foam. Usually diols provide soft foams, firmer foams are obtained by the incorporation of polyether polyols having more than two hydroxyl groups, including triols, tetraols, pentols and hexols. When it is desired to produce polyurethanes having comparatively high load-bearing properties and/or diecutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 28 to about 150, and is usually no higher than about 80.

The polyisocyanates used in the manufacture of polyurethanes are known to the art and any such reactants are suitably employed in producing the flexeible polyether-based polyurethane foams of the present invention. Among such suitable polyisoyanates are those represented by the general formula:

Q'(NCO)$_i$ wherein: $i$ has an average value of at least two and is usually no more than six, and Q' represents an aliphatic, cycloaliphatic or aromatic radical which can be unsubstituted hydrocarbyl group or a hydrocarbyl group substituted, for example, with halogen alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate, 2,4-tolylene diisocyanate, 2,6-tolylene diisocyanate, crude tolylene diisocyanates, 6-isopropyl-1,3-phenylenediisocyanate, durylene diisocyanate, triphenylmethane-4,4',4"-triisocyanate, and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

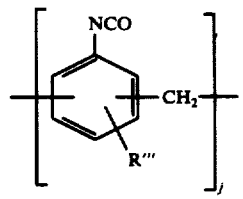

wherein R''' is hydrogen and/or lower alkyl and $j$ has an average value of at least 2.1. Preferably the lower alkyl radical is methyl and $j$ has an average value of from 2.1 to about 3.0. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCI-10 and NCO-20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyether polyol and organic polyisocyanate usually constitute the major proportion by weight of the polyurethane-forming reaction mixture. In general, the polyisocyanate and polyether polyol reactants are employed in relative amounts such that the ratio of total —NCO equivalents to total active hydrogen equivalent (of the polyether polyol and any water, when used) is from 0.8 to 1.5, preferably from 0.9 to 1.1, equivalents of —NCO per equivalent of active hydrogen. This ratio is known as the Isocyanate Index and is often also expressee as a percent of the stoichiometric amount of polyisocyanate required to react with total active hydrogen. When expressed as a percent, the Isocyanate Index may be from 80 to 150, and is preferably within the range from about 90 to about 110.

The urethane-forming reaction is effected in the presence of a minor amount of a catalyst comprising an amine. This component of the polyurethane-forming reaction mixture is usually a tertiary amine. Suitable amine catalysts include one or more of the following: N-methylmorpholine; N-ethylmorpholine; N-octadecylmorpholine; triethylamine; tributylamine, trioctylamine; N,N,N',N'-tetramethylethylenediamine; N,N,N',N'-tetramethyl-1,3-butane-diamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e., diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the beta-tertiary amino amides and esters described in U.S. Pat. No. 3,821,131, as exemplified by 3-dimethylamino-N,N-dimethylpropionamide. Also useful as the amine catalyst are the beta-tertiary-amino nitriles described in copending application Ser. No. 369,556, filed June 13, 1973, now U.S. Pat. No. 3,925,268, of W. R. Rosemund, M. R. Sandner and D. J. Trecker, as exemplified by 3-dimethylaminopropionitrile as such or in combination with other tertiary amines such as bis[2-(N,N-dimethylamino)ethyl]ether. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of the polyether polyol reactant.

In producing polyurethanes from polyether polyols usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichlorofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. The generally preferred method of foaming for producing flexible foams is the use of water or a combination of water plus a fluorocarbon blowing agent such as trichlorofluoromethane.

The amount of blowing agent employed will vary with factors such as the desired density of the foamed product. Usually, however, from about 1 to about 30 parts by weight of the blowing agent per 100 parts by weight of the polyether polyol reactant is preferred. Foam densities may be within the range from about 0.8 to about 5 pounds per cubic foot (pcf). Polyurethane foam of relatively low density such as 2 pcf and less is usually prepared employing blowing agent comprising water in an amount of at least about 3 parts by weight per 100 parts by weight of polyether polyol reactant, whereas higher density foam is provided at lower levels of water with and without the use of an auxiliary fluorocarbon blowing agent. It is to be understood, however, that these are general guidelines and that the choice of the particular amount of blowing agent employed to obtain a desired foam density specification varies from formulation to formulation and is well within the skill of the art to which the present invention pertains.

The organic flame-retardants that can be employed in producing flexible polyether foams in accordance with the teachings of this invention can be chemically combined in one or more of the other materials used (e.g., in the polyether polyol or polyisocyanate), or they can be used as discrete chemical compounds added as such to the foam formulation. The organic flame-retardants preferably contain phosphorus or halogen, or both phosphorus and halogen. Usually, the halogen, when present, is chlorine and/or bromine. Flame-retardants of the discrete chemical variety include: 2,2-bis(-bromomethyl)-1,3-propanediol (also known as dibromoneopentyl glycol); 2,3-dibromopropanol, tetrabromophthalic anhydride; brominated phthalate ester diols such as those produced from tetrabromophthalic anhydride, propylene oxide and propylene glycol; tetrabromo-bisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris(2,3-dibromopropyl)phosphate; tris(1,3-dichloropropyl)phosphate; tris(1-bromo-3-chloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate; and 0,0-diethyl-N,N-bis(2-hydroxyethyl)aminomethyl phosphonate. Also suitable are compounds having the formulas:

 and

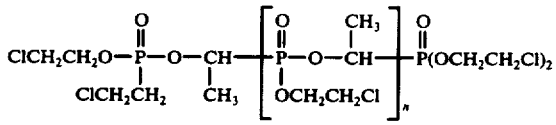

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

Those of the above flame-retardants of the discrete chemical compound variety which contain groups reactive with hydroxyl or isocyanato groups can be used as reactants in producing the polyether polyol reactant or they can be reacted with organic polyisocyanates, to produce modified polyols or polyisocyanates having chemically combined flame-retarding groups. Such modified polyether polyols and polyisocyanates are also useful as reactants in the process of this invention. In such cases, due regard must be given to the possible effect of the functionality of the compound on the other properties (e.g., degree of flexibility) of the resulting foam.

The flame-retarding agent can be used in an amount from about 1 to about 30 parts by weight per 100 parts by weight of the polyether polyol reactant, and is usually employed in an amount of at least about 5 parts by weight. It is evident that the particular amount of flame-retardant employed depends largely on the efficiency of any given agent in reducing flammability.

The polyether-based polyurethane foams of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the foam stabilizing component comprising the organosilicone polymer of the present invention, to the reaction mixture as a premixture with one or more of the blowing agent, polyether polyol, amine catalyst and, when used, the flame-retardant. It is to be understood that the relative amounts of the various components of the foam formulations are not narrowly critical. The polyether polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst, metal co-catalyst and the foam stabilizing organosilicone polymers of the present invention are each present in a minor amount necessary to achieve the function of the component. Thus, the blowing agent is present in an amount sufficient to foam the reaction mixture, the amine catalyst is present in a catalytic amount (i.e., an amount sufficient to catalyze the reaction to produce the urethane at a reasonable rate), and the organosilicone polymer of this invention is present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as fillers, dyes, pigments, anti-yellowing agents and the like. The polyurethanes produced in accordance with the present invention are used in the same areas as conventional flexible polyether polyurethanes and are especially useful where improved fire-resistance properties are beneficial. Thus, the foams of the present invention are used with advantage in the manufacture of textile interliners, cushions, mattresses, paddings, carpet underlay, packaging, gaskets, sealers, thermal insulators and the like.

The organosilicone polymers of this invention as seen by the following examples, have been found to be effective foam stabilizers for flexible polyether urethane foam, even when a flame retardant is employed in the foam formulation. Said polymers have also been found to help provide good breathability and have a wide operating range.

The following examples illustrate the present invention and are not to be regarded as limitative. It is to be understood that all parts, percentages and proportions referred to herein and in the claims are by weight unless otherwise indicated. Moreover, as used herein, the following terms and symbols have the indicated significance:

In the formulas "Me" designates a methyl group, —CH$_3$; "Et" designates an ethyl group, —C$_2$H$_5$; the bridging group, —C$_3$H$_6$ represents —CH$_2$CH$_2$CH$_2$—; "Bu" designates a n-butyl group, C$_4$H$_9$—; the symbol T represents a siloxy unit of the formula (MeSiO$_{3/2}$); the symbol D represents siloxy unit of the formula (Me$_2$SiO); the symbol D" represents a siloxy unit of the formula

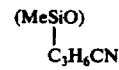

and the symbol (PE) represents a mixture of randomly distributed oxyalkylene radicals consisting of 78 wt.%-(C$_3$H$_6$O)$_{14}$(C$_2$H$_4$O)$_{18.4}$C$_4$H$_9$ and 22 wt.%-(C$_3$H$_6$O)$_{24.3}$(C$_2$H$_4$O)$_{32.1}$C$_4$H$_9$. If desired said mixture represented by (PE) can also be written as a polyether radical having the average composition

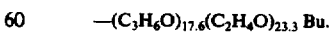

Moreover, in the examples and comparative runs which follow various organosilicone polymers within and without the scope of the present invention were evaluated as the foam stabilizing component of a variety of foam-producing reaction mixtures to provide flexible polyether polyurethane foam with and without a flame-retardant. These various reaction mixtures are referred to herein as Foam Formulations A through D. The components and relative proportions of components in said reaction mixtures are as indicated in the following Tables I through IV, respectively.

TABLE I
FOAM FORMULATION A

| Component | Parts by Weight |
| --- | --- |
| Polyether polyol having a hydroxyl number of 56 produced by reacting mixture of glycerol and dipropylene glycol and propylene oxide to a hydroxyl number of 59, and capping this product with ethylene oxide to the final hydroxyl number | 100.0 |
| /1/ Tolylene Diisocyanate (Index 105) | 34.4 |
| Water | 2.5 |
| A mixture of 70% Bis[2-(N,N-dimethylamino)ethyl]ether and 30% dipropylene glycol (amine catalyst) | 0.1 |
| A mixture of 33% triethylenediamine and 67% dipropylene glycol (amine catalyst) | 0.225 |
| Stannous Octoate (tin catalyst) | Varied, see Table VII |
| Monsanto PHOSGARD® 2 XC-20 Flame Retardant $(ClCH_2)_2C[CH_2OP(O)(OCH_2CH_2Cl)_2]_2$ | Varied, see Table VII |
| Surfactant Foam Stabilizer | Varied, see Table VII |

/1/ This component was a mixture of the 2,4- and 2,6-isomers of tolylene diisocyanate present in a weight ratio of 80:20, respectively. Index 105 designates that the amount of mixture employed was 105 weight percent of the stoichiometric amount required to react with total reactive hydrogens from the polyether polyol and water present in the foam formulation.

TABLE II
FOAM FORMULATION B

| Components | Parts by Weight |
| --- | --- |
| Polyether Polyol having a Hydroxyl Number of about 46 produced by reacting glycerol, propylene oxide and ethylene oxide. | 100 |
| Tolylene Diisocyanate (Index 105) /1/ | 57.0 |
| Water | 4.85 |
| Trichlorofluoromethane | 15.0 |
| Dimethylethanolamine | 0.35 |
| Stannous octoate | 0.3 |
| Surfactant Foam Stabilizer | Varied, see Table VIII |

/1/ Same as defined in Foam Formulation A.

TABLE III
FOAM FORMULATION C

| Components | Parts by Weight |
| --- | --- |
| Polyether Polyol having a hydroxyl Number of 56 produced by reacting glycerol and propylene oxide | 100.0 |
| Tolylene Diisocyanate (Index 105) /1/ | 49.73 |
| Tris(2-chloroethyl)phosphate | 10 |
| Water | 4.0 |
| A mixture of 70% Bis[2-(N,N-dimethylamino)ethyl]ether and 30% dipropylene glycol | 0.1 |
| Stannous octoate | 0.35 |
| Surfactant Foam Stabilizer | Varied, see Table IX |

/1/ Same as defined in Foam Formulation A.

TABLE IV
FOAM FORMULATION D

| Components | Parts by Weight |
| --- | --- |
| Polyether Polyol /1/ | 100 |
| Tolylene Diisocyanate (Index 105) /2/ | 49.9 |
| Water | 4.0 |
| A mixture of 70% Bis[2-(N,N-dimethylamino)ethyl]ether and 30% dipropylene glycol | 0.075 |
| A mixture of 33% triethylenediamine and 67% dipropylene glycol | 0.225 |
| Stannous octoate (tin catalyst) | Varied, see Table X |
| Monsanto PHOSGARD® 2 XC-20 Flame Retardant $(ClCH_2)_2C[CH_2OP(O)(OCH_2CH_2Cl)_2]_2$ | Varied, see Table X |
| Surfactant, Foam Stabilizer | Varied, see Table X |

/1/ Same as defined in Foam Formulation A.
/2/ Same as defined in Foam Formulation A.

GENERAL FOAM PROCEDURE

Except as noted, the foams of the following examples and comparative runs were prepared employing substantially the same procedure which entails the following manipulative steps: After dispensing the polyether polyol reactant in a container, the flame-retardant (when used) is added thereto and dispersed therein with a spatula. The surfactant foam stabilizer is then added from a syringe and is also dispersed with a spatula. After inserting a baffle, a premixture of the amine catalyst and blowing agent is added but not dispersed. The resulting blend is then placed in a drill press and the mixture agitated 15 seconds at 2000 revolutions per minute. Agitation is then stopped and the stannous octoate co-catalyst is added from a syringe. Agitation is continued for an additional 8 seconds, after which the diisocyanate reactant is added rapidly and the agitation is continued for another 7 seconds. After the mixing cycle, the mixture is poured into a parchment-lined container supported by a wooden mold. The foam is allowed to rest in the container for at least 3 minutes and is then cured in an oven for 10–15 minutes at 130° C. After cutting, the height of the foam rise is measured, and foam samples are prepared for breathability and burning extent determinations.

"Breathability" denotes the porosity of a foam and is roughly proportional to the number of open cells in a foam. As reported herein, breathability was determined in accordance with the NOPCO test procedure described by R. E. Jones and G. Fesman, "Journal of Cellular Plastics" (January, 1965), as follows: A 2 inch × 2 inch × 1 inch piece of foam is cut from near the center of the bun. Usng a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM).

"Burning Extent" was determined in accordance with standard flammability test procedure ASTM D-1692-68, except that five test specimens of foam were used instead of ten. Burning extent denotes the burned length (in inches) of the foam and is reported as the average of the results obtained with the various test specimens of a given foam. On the basis of this test, an average burning extent of less than 5.0 inches qualifies the foam for a self-extinguishing ("SE") rating. When the burning extent of at least one test specimen of 5.0 inches or greater, the foam is assigned a burning (Burns) rating and usually no further specimens of that foam are tested.

"Burning Time" denotes the average time (in seconds) taken to give the specified burning extent.

As used herein, the abbreviation "p.h.p." means that the concentration of a particular component of the foam formulation is expressed in parts by weight per 100 parts by weight of the polyether polyol reactant contained in the formulation.

and is hereinafter designated as Intermediate Fluid No. 11, as shown in Table V below.

Except as noted, a series of other cyano-modified, alkoxy end-blocked siloxane intermediate fluids were prepared employing substantially the same procedure as Example 1, as shown in the following Table V.

TABLE V
PREPARATION OF CYANO-MODIFIED, ALKOXY ENDBLOCKED SILOXANE INTERMEDIATE FLUIDS

| Intermediate Fluid No. | Average Formula | MeSi(OEt)$_3$ Used | | Cyclic (Me$_2$SiO) Used | | Cyclic [(Me)(NCC$_3$H$_6$)SiO] Used | | % OEt in Product | | Used in Surfactant Prep. /1/ | Remarks |
|---|---|---|---|---|---|---|---|---|---|---|---|
| | | Moles | Grams | Moles | Grams | Moles | Grams | Cal'd | Found | | |
| 1* | TD$_{12}$D''$_4$(Et)$_3$ | 0.05 | 8.9 | 0.60 | 44.5 | 0.20 | 25.4 | 8.6% | 7.4% | II | /2/ |
| 2 | TD$_{14}$D''$_4$(Et)$_3$ | 0.05 | 8.9 | 0.70 | 51.9 | 0.20 | 25.4 | 7.8% | 7.7% | III | /3/ |
| 3 | TD$_{18}$D''$_4$(Et)$_3$ | 0.05 | 8.9 | 0.90 | 66.7 | 0.20 | 25.4 | 6.7% | 6.8% | IV | |
| 4 | TD$_9$D''$_6$(Et)$_3$ | 0.05 | 8.9 | 0.45 | 33.3 | 0.30 | 38.1 | 8.4% | 8.4% | V | /3/ |
| 5 | TD$_9$D''$_7$(Et)$_3$ | 0.08 | 14.2 | 0.72 | 53.4 | 0.24 | 30.5 | 11.0% | 11.1% | VI | |
| 6 | TD$_9$D''$_9$(Et)$_3$ | 0.05 | 8.9 | 0.45 | 33.3 | 0.45 | 57.2 | 6.8% | 6.7% | VII | |
| 7 | TD$_{22}$D''$_6$(Et)$_3$ | 0.039 | 6.9 | 0.86 | 63.6 | 0.23 | 29.7 | 5.25% | 5.5% | I | |
| 8 | TD$_{20}$D''$_3$(Et)$_3$ | 0.049 | 8.7 | 0.98 | 72.6 | 0.15 | 18.7 | 6.6% | 6.5% | VIII | |
| 9 | TD$_{18.5}$D''$_1$(Et)$_3$ | 0.06 | 10.7 | 1.11 | 82.3 | 0.06 | 7.6 | 7.6% | 7.8% | IX | |
| 10 | TD$_{22}$D''$_6$(Et)$_3$ | 0.24 | 42.7 | 5.28 | 391.2 | 1.44 | 183.0 | 5.25% | 5.0% | X, XI | |
| 11 | TD$_{22}$D''$_6$(Et)$_3$ | 0.24 | 42.7 | 5.28 | 391.2 | 1.44 | 183.0 | 5.25% | 5.3% | Ia,XII, XIII | /4/ |
| 12 | TD$_{22}$D''$_6$(Et)$_3$ | 0.24 | 47.7 | 5.28 | 391.2 | 1.44 | 183.0 | 5.25% | 5.25% | XIV to XVIII | |
| 13 | TD$_{22}$D''$_6$(Et)$_3$ | 0.04 | 7.1 | 0.88 | 65.2 | 0.24 | 30.5 | 5.1% | 4.6% | XIX to XXI | /5/ |
| 14 | TD$_{16.2}$(Et)$_3$ | — | — | — | — | None | None | 8.8% | 8.8% | B | /6/ |
| 15** | TD$_{18.2}$(Et)$_3$ | 0.130 | 23.2 | 2.37 | 175.3 | None | None | 8.8% | 8.9% | Ba, Bb | |
| 16 | TD$_{18.2}$(Et)$_3$ | 0.07 | 12.5 | 1.27 | 94.4 | None | None | 8.8% | 9.3% | Bc,Bd,Be | |
| 17 | TD$_{18.2}$(Et)$_x$ | 0.07 | 12.5 | 1.27 | 94.4 | None | None | 8.6% | 8.2% | Bf,Bg | /5/ |

Footnotes for Table V
*TD$_{12}$D''$_4$ (Et)$_3$ represents the average formula:
(MeSiO$_{3/2}$)(Me$_2$SiO)$_{12}$(MeSiO)$_4$(Et)$_3$.
C$_3$H$_6$CN
**TD$_{18.2}$(Et)$_3$ represents the average formula:
(MeSiO$_{3/2}$)(Me$_2$SiO)$_{18.2}$(Et)$_3$.
The other intermediate fluids have the corresponding meanings shown in their average formulas.
/1/ Indicates which Surfactant Foam Stabilizer in Table VI below was produced with the corresponding Intermediate Fluid of Table V.
/2/ Stripped.
/3/ Equilibrated twice.
/4/ Fresh tetramethyl ammonium silanolate catalyst was used.
/5/ Plant grade MeSi(OEt)$_3$ used; ethoxy content 73.5% rather than 77% for pure MeSi(OEt)$_3$.
/6/ Plant produced using MeSi(OEt)$_3$; ethoxy content 73.5% rather than 77% for pure MeSi(OEt)$_3$.

EXAMPLE 1

A cyano-modified siloxane intermediate fluid (Fluid No. 11 in Table V) was prepared by the following method:

Into a 1000 ml, three-necked flask, equipped with thermometer, heating mantle, mechanical stirrer, condenser, and positive nitrogen atmosphere were charged 42.7 grams (0.24 mole) MeSi(OEt) (distilled), 391.2 grams (5.28 mole) distilled (Me$_2$SiO)$_4$ cyclic tetramer, and 183.0 grams (1.44 mole) cyclic gamma-cyanopropylmethylsiloxane. This heterogeneous mixture was stirred and heated to 90° C. At 90° C., tetramethyl ammonium silanolate catalyst (100 ppm as K) was added, and the mixture became colored and homogeneous almost immediately. The mixture was held at 90° C. with stirring for three hours. It was then heated to 150° C. and held for 2 hours at this temperature to insure deactivation of the catalyst. After cooling to room temperature, the product was filtered through a medium glass-fitted funnel to give a clear, orange-yellow colored fluid. Ethoxy content: theoretical: 5.25 percent, found: 5.31 percent. The cyano-modified alkoxy endblocked siloxane intermediate fluid product has the average formula:

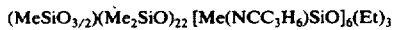

EXAMPLE 2

A siloxane surfactant (Surfactant Ia in Table VI) was prepared by the following method:

Into a 1000 ml, three-necked flask, equipped with thermometer, heating mantle, mechanical stirrer, two-foot long packed column, distillation head, and receiver, and positive negative atmosphere were charged 70.1 grams (6.8 percent molar deficiency) of a polyether blend of 78 weight percent BuO(C$_2$H$_4$O)$_{18.4}$(C$_3$H$_6$O)$_{14}$H and 22 weight percent of BuO(C$_2$H$_4$O)32.1(C$_3$H$_6$O)$_{24.3}$H; percent of total OH = 0.8 and the oxyalkylene groups of the two polyethers are randomly distributed. This represents a polyether of 2125 molecular weight with the following average structure BuO(C$_2$H$_4$O)$_{23.3}$(C$_3$H$_6$O)$_{17.6}$H, and 50 ml of toluene (30 weight percent of final pot). This mixture was heated to reflux and the moisture was removed as the toluene-water azeotrope at the hood. Heating was then stopped and the mixture was allowed to cool below 70° C.

At this time, 30 grams (0.0354 mole EtO) of the cyano-modified Intermediate Fluid No. 11 in Table V (5.31 percent ethoxyl content) prepared as in Example 1, was added to the mixture along with 10 ml of toluene, giving a heterogeneous mixture. The reaction mixture was then catalyzed at <50° C. with 0.05-0.07 grams KOOCCH$_3$ and 0.25 grams trifluoroacetic acid. Heating was applied and reflux temperature was reached within 10 minutes. After five more minutes, the mixture cleared, exhibiting a slight yellowish color and substantial foaming. The EtOH-toluene azeotrope at the head was removed slowly, dropwise, over a one-hour period, with the head temperature rising through the range 76°-110° C. and the pot temperature rising through the range 129°-139° C. After approximately 1.3 hours from time of catalysis heating was topped and the product solution was allowed to cool to about 50° C. Five grams of NaHCO₃ was then added to the pot and vigorous stirring followed for over 30 minutes.

The product solution was then filtered through a 5 microns pad in a pressure filter and the clear filtrate was desolvated by rotary evaporation at 55° C./1 mm. About 96 grams of desired polysiloxane-polyoxyalkylene block copolymer product, which was a light yellow fluid of 960 cps. viscosity, was obtained. The copolymer product hereinafter designated as Surfactant Ia, as shown in Table VI below had the average formula:

$$(MeSiO3/2)(Me_2SiO)_{22}(MeSiO)_6[(C_3H_6O)_{17.6}(C_2H_4O)_{23.3}Bu]_3$$
$$|$$
$$C_3H_6CN$$

Ethoxy content, found: 0.027 percent.

Except as noted, a series of other polysiloxanepolyoxyalkylene block copolymer surfactants were prepared employing substantially the same procedure as Example 2 as shown in the following Table VI.

TABLE VI
PREPARATION OF POLYSILOXANEPOLYOXYALKYLENE BLOCK COPOLYMER SURFACTANTS

| Surfactant No. | Average Formula | Intermediate Fluid Used++ | Nominal OH/Et Ratio | Amt. of Intermediate Fluid Used++ Grams | Moles EtO | Amt. of Polyether Used+++ Grams | Moles OH | Amt. of Toluene Used Wt. % | Reaction time (Hours) | Viscosity of Product (Cps) | Residual OEt % |
|---|---|---|---|---|---|---|---|---|---|---|---|
| B | TD₁₆.₂(PE)₃ | 14 | 2% Deficiency | 43 | 0.0841 | 175 | 0.0824 | 30 | 3.0 | 1100 | 0.2 |
| I* | TD₂₂D₆″(PE)₃ | 7 | 6.8% Def. | 59 | 0.0721 | 143.6 | 0.0676 | 30 | 1.5 | 900 | 0.08 |
| Ia*** | TD₂₂D₆″(PE)₃ | 11 | 7% Def. | 30 | 0.0354 | 70.1 | 0.0330 | 30 | 1.3 | 960 | 0.03 |
| II | TD₁₂D₄″(PE)₃ | 1 | 13% Grams | 40 | 0.0658 | 158.6 | 0.0746 | 30 | 1.5 | 500 | 0.2 |
| III | TD₁₄D₄″(PE)₃ | 2 | 1% Def. | 40 | 0.0684 | 144.3 | 0.0679 | 30 | 3.0 | 870 | 0.06 |
| IV | TD₁₈D₄″(PE)₃ | 3 | 4% Def. | 40 | 0.0604 | 123.8 | 0.0583 | 30 | 3.0 | 820 | 0.03 |
| V | TD₉D₆″(PE)₃ | 4 | 2% Def. | 40 | 0.0693 | 143.9 | 0.0677 | 30 | 3.5 | 750 | 0.04 |
| VI | TD₉D₃″(PE)₃ | 5 | 3% Def. | 35 | 0.0863 | 178.5 | 0.0840 | 30 | 3.0 | 850 | 0.05 |
| VII | TD₉D₅″(PE)₃ | 6 | 1% Excess | 45 | 0.0670 | 143.6 | 0.0676 | 30 | 2.5 | 920 | 0.04 |
| VIII | TD₂₀D₁″(PE)₃ | 8 | 7% Def. | 30 | 0.0436 | 86.3 | 0.0406 | 30 | 1.3 | 1000 | 0.09 |
| IX | TD₁₈.₅D₁″(PE)₃ | 9 | 7% Def. | 50 | 0.0861 | 170.5 | 0.0802 | 30 | 1.6 | 1000 | 0.06 |
| X | TD₂₂D₆″(PE)₃ | 10 | 8% Excess | 540 | 0.605 | 138.6 | 0.652 | 30 | 1.5 | 780 | 0.33 |
| XI | TD₂₂D₆″(PE)₃ | 10 | 7% Def. | 61.5 | 0.0689 | 136.8 | 0.0644 | 30 | 1.5 | 940 | 0.24 |
| XII | TD₂₂D₆″(PE)₃ | 11 | 1:1 | 30 | 0.0354 | 74.2 | 0.0354 | 30 | 1.3 | 1000 | 0.03 |
| XIII | TD₂₂D₆″(PE)₃ | 11 | 15% Def. | 30 | 0.0354 | 63.1 | 0.0301 | 30 | 1.3 | 1000 | 0.05 |
| XIV**** to XVIII | TD₂₂D₆″(PE)₃ | 12 | 6% Def. | 232 | 0.271 | 537 | 0.256 | 30 | 1.3 | 800 | 0.15 |
| XIX** | TD₂₂D₆″(PE)ₓ | 13 | 1:1 | 34 | 0.0348 | 73.2 | 0.03458 | 30 | 0.5 | 880 | 0.39 |
| XX** | TD₂₂D₆″(PE)ₓ | 13 | 1:1 | 34 | 0.348 | 73.2 | 0.0348 | 30 | 1.0 | 750 | 0.67 |
| XXI** | TD₂₂D₆″(PE)ₓ | 13 | 1:1 | 34 | 0.0348 | 73.2 | 0.0348 | 30 | 1.8 | 920 | 0.07 |
| Ba | TD₁₈.₂(PE)₃ | 15 | 8% Def. | 22 | 0.0435 | 85.4 | 0.0402 | 30 | 3.0 | 1020 | 0.05 |
| Bb | TD₁₈.₂(PE)₃ | 15 | 8% Def. | 44 | 0.0870 | 170.8 | 0.0804 | 30 | 2.0 | 1250 | 0.04 |
| Bc | TD₁₈.₂(PE)₃ | 16 | 1:1 | 20 | 0.0413 | 86.7 | 0.0413 | 30 | 1.5 | 970 | 0.16 |
| Bd | TD₁₈.₂(PE)₃ | 16 | 1:1 | 20 | 0.0413 | 86.7 | 0.0413 | 30 | 3.0 | 1320 | 0.09 |
| Be | TD₁₈.₂(PE)₃ | 16 | 1:1 | 20 | 0.0413 | 86.7 | 0.0413 | 30 | 2.0 | 1050 | 0.11 |
| Bf** | TD₁₈.₂(PE)ₓ | 17 | 4% Excess | 20 | 0.0364 | 79.4 | 0.0378 | 30 | 2.0 | 920 | 0.15 |
| Bg** | TD₁₈.₂(PE)ₓ | 17 | 4% Excess | 20 | 0.0364 | 79.4 | 0.0378 | 30 | 3.0 | 920 | 0.26 |

*TD₂₂D₆″ (PE)₃ represents the average formula
(MeSiO3/2) (Me₂SiO)₂₂ (MeSiO)₆ [(C₃H₆O)₁₇.₆ (C₂H₄O)₂₃.₃Bu]₃
|
C₃H₆CN The other siloxane surfactants have the corresponding meanings shown in their average formulas.
**These surfactants were made from production using MeSi(OEt)₃ having an ethoxy content of 73.5% rather than 77% for pure MeSi(OEt)₃.
***Optimized
****Blend of five surfactants from five identical preparations.
++Avg. formula as shown in TABLE V.
+++The hydroxy end-blocked polyether reactant in each instance was a mixture of 78 Wt.% BuO(C₂H₄O)₁₈.₄(C₃H₆O)₁₄H and 22 wt. % BuO(C₂H₄O)₃₂.₁(C₃H₆O)₂₄.₃H polyethers, the oxyalkylene groups of both polyethers being randomly distributed. Said mixture may also be written as an average composition of BuO(C₂H₄O)₂₃.₃(C₃H₆O)₁₇.₆H.

EXAMPLE 3

In accordance with this example a series of flexible polyether urethane foams were produced using various surfactant foam stabilizers, FOAM FORMULATION A, and the foaming process detailed above. The results of these various flexible polyether foam preparations, which contain a flame retardant, are given in TABLE VII below.

TABLE VII

| Surfactant* Number | Surfactant* Conc. (php) | Flame Retardant Conc. (php) | Tin Conc. (php) | Foam Rise Inches | Breathability (SCFM) | Density (pcf) | Cells Per Inch | Burning Extent (Inches) | Rating | Burning Time (Seconds) |
|---|---|---|---|---|---|---|---|---|---|---|
| A** | 1.3 | 6 | 0.07 | 4.1 | 1.6 | 2.53 | 30/35 | Full | Burns | |
| A** | 1.3 | 3 | 0.07 | 4.1 | 1.7 | 2.54 | 30/35 | Full | Burns | |
| A** | 1.3 | 1 | 0.1 | 4.1 | 1.5 | 2.44 | 30/35 | Full | Burns | |
| Ba | 1.3 | 3 | 0.09 | 4.1 | 2.5 | 2.50 | 30/35 | Full | Burns | |
| C*** | 0.35 | 6 | 0.09 | 4.1 | 1.2 | 2.66 | 30/35 | 0.9 | SE | 20 |
| C*** | 0.35 | 3 | 0.09 | 4.2 | 1.5 | 2.50 | 30/35 | 1.3 | SE | 23 |
| C*** | 0.35 | 1 | 0.09 | 4.1 | 1.5 | 2.47 | 30/35 | 1.7 | SE | 28 |
| I | 1.3 | 6 | 0.09 | 4.1 | 1.7 | 2.56 | 30/35 | 0.9 | SE | 17 |
| I | 1.3 | 3 | 0.09 | 4.2 | 2.3 | 2.50 | 25/30 | 1.4 | SE | 27 |
| I | 1.3 | 2 | 0.1 | 4.2 | 1.8 | 2.49 | 25/30 | 1.6 | SE | 26 |
| I | 1.3 | 1 | 0.1 | 4.1 | 2.1 | 2.47 | 25/30 | Full | Burns | |
| Ia | 1.3 | 3 | 0.09 | 4.2 | 1.85 | 2.60 | 30/35 | 1.5 | SE | 32 |
| XII | 1.3 | 3 | 0.09 | 4.1 | 2.1 | 2.57 | 30/35 | 1.5 | SE | 31 |
| XII | 1.3 | 3 | 0.09 | 4.1 | 3.2 | 2.54 | 30/35 | 1.7 | SE | 35 |
| XIII | 1.3 | 3 | 0.09 | 4.2 | 3.2 | 2.50 | 30/35 | 1.6 | SE | 31 |
| XXI | 1.3 | 3 | 0.09 | 4.1 | 3.0 | 2.65 | 30/35 | 1.8 | SE | 36 |
| XIV–XVIII#1.3 | | 3 | 0.09 | 4.1 | 2.6 | 2.60 | 30/35 | 2.0 | SE | 40 |
| VIII | 1.3 | 3 | 0.09 | 4.2 | 2.7 | 2.50 | 30/35 | 2.8 | SE | 63 |
| IX | 1.3 | 3 | 0.09 | 4.2 | 3.1 | 2.48 | 30/35 | Full | Burns | |

Blend
*Unless otherwise indicated the structure of the surfactant used as the foam stabilizer can be found in TABLE VI.
**A. This Surfactant has the average formula
$(MeSiO3/2)(Me_2SiO)_{16.2}[(C_3H_6O)_{16.3}(C_2H_4O)_{21.6}Bu]_3$
***C. This Surfactant has the average formula
$Me_3SiO(Me_2SiO)_{60}(MeSiO)_{10}(MeSiO)_6SiMe_3$

$C_3H_6CN \quad C_3H_6O(C_3H_6O)_{25.6}(C_2H_4O)_{24.9}Me$

The data in TABLE VII clearly shows that the use of Surfactants I, Ia, VIII, XII, XIII, the blend of XIV to XVIII, and XXI which are representative of the present invention gave better foam breathability results than comparative Surfactants A and C which are outside of the scope of the present invention, while also provided a better foam burning rating than Surfactant A, as well as Surfactants Ba and IX which are also outside of the scope of the present invention.

EXAMPLE 4

In accordance with this example, a series of flexible polyether urethane foams were prepared using various surfactant foam stabilizers, FOAM FORMULATION B, and the foaming process detailed above. The results of these various flexible polyether foam preparations, which are free of a flame retardant, are given in TABLE VIII below.

TABLE VIII

| Surfactant Number* | Surfactant Concentration (php) | Foam Rise Inches | Breathability (SCFM) | Top Collapse Inches |
|---|---|---|---|---|
| A** | 1.0 | 10.7 | | |
| B | 0.8 | 11.0 | | |
| B | 1.0 | 11.5 | | |
| B | 1.2 | 11.9 | | |
| C** | 0.6 | 11.7 | 3.5 | 0.3 |
| I | 0.6 | 10.7 | 4.9 | 1.0 |
| I | 0.8 | 11.2 | 4.9 | 0.8 |
| I | 1.0 | 11.3 | 4.8 | 0.6 |
| I | 1.2 | 11.4 | 4.6 | 0.4 |
| Ia | 0.6 | 11.1 | 4.9 | 0.9 |
| Ia | 1.2 | 11.6 | 4.2 | 0.4 |
| II | 2.0 | Collapsed | | |
| III | 1.0 | 10.2 | | |
| IV | 0.8 | 11.1 | 5.3 | 0.9 |
| IV | 1.0 | 11.1 | 4.8 | 0.5 |
| IV | 1.2 | 11.6 | 4.9 | 0.4 |
| V | 3.0 | 10.3 | 3.3 | 1.8 |
| VI | 3.0 | Collapsed | | |
| VII | 3.0 | Collapsed | | |
| VIII | 0.6 | 11.7 | 5.6 | 0.7 |
| VIII | 1.2 | 12.2 | 4.4 | 0.3 |
| IX | 0.6 | 11.1 | 6.1 | 0.9 |
| IX | 1.2 | 11.9 | 5.5 | 0.3 |

*Unless otherwise indicated the average formula of the Surfactant used as the foam stabilizer can be found in TABLE VI.
**The average formulas of Surfactants A and C are found in the footnotes of TABLE VII.

The data in TABLE VIII above indicates that the Surfactants have the following potency ratings:

| Surfactant | Rating |
|---|---|
| B | Good |
| I | Good |
| Ia | Excellent |
| II | Failed |
| III | Poor |
| IV | Fair |
| V | Failed |
| VI | Failed |
| VII | Failed |
| VIII | Excellent |
| IX | Excellent |

Additional potency determinations with FOAM FORMULATION B were made on the remainder of the surfactants of TABLE VI. The results were as follows.

| Surfactant | Potency |
|---|---|
| X | Poor |
| XI | Good |
| XII | Fair |
| XIII | Good |
| XIV–XVII (Blend) | Good |
| XIX | Very Poor |
| XX | Failed |
| XXI | Fair |
| Ba | Good |
| $B_b$ to $B_f$ | All Excellent |
| $B_g$ | Very Good |

EXAMPLE 5

In accordance with this example, a series of flexible polyether urethane foams were prepared using various surfactant foam stabilizers, FOAM FORMULATION C, and the foaming process detailed above. The results of these various flexible polyether foam preparations, which contain a flame retardant are given in TABLE IX below.

TABLE IX

| Surfactant No.* | Surfactant Conc (php) | Foam Rise (Inches) | Breathability (SCFM) | Density (pcf) | Burning Extent (inches) | Burning Time (sec.) | Cells per Inch |
|---|---|---|---|---|---|---|---|
| A** | 1.0 | 7.8 | 3.5 | 1.64 | Full | | 30/35 |
| B | 1.0 | 7.6 | 3.5 | 1.64 | Full | | 30/35 |
| C** | 0.5 | 7.7 | 3.5 | 1.7 | 2.2 | 36 | 30/35 |
| I | 1.0 | 7.4 | 4.3 | 1.69 | 2.2 | 37 | 30.35 |
| I | 1.4 | 7.2 | 3.9 | 1.69 | 2.2 | 38 | 30/35 |
| II | 2.0 | 6.2 | 2.6 | 2.05 | 1.8 | 40 | Voids |
| III | 1.0 | 7.3 | 4.0 | 1.71 | 2.6 | 36 | 30/35 |
| IV | 1.0 | 7.6 | 4.3 | 1.64 | 2.5 | 40 | 30/35 |
| IV | 1.4 | 7.8 | 4.2 | 1.65 | 2.6 | 42 | 30/35 |
| V | 2.0 | 6.3 | 3.6 | 1.9 | 2.2 | 44 | Coarse |

*Unless otherwise indicated the avg. formula of the Surfactant used as the foam stabilizer can be found in TABLE VI.
**The avg. formulas of Surfactants A and C are found in the footnotes of TABLE VII.

The data in TABLE IX clearly shows that the use of Surfactants I, II, III, IV and V which represent the present invention are effective stabilizers of flexible polyether foam and offer the further advantage of allowing for the formation of foams containing a flame retardant of a significantly lower flammabiity rating than foams stablized by comparative Surfactants A and B.

EXAMPLE 6

In accordance with this example a series of flexible polyether urethane foams were prepared whereby Surfactant I (TABLE VI above) representing the present invention was compared with Surfactant A (TABLE VII above) which is outside the scope of the present invention. The foams were prepared using FOAM FORMULATION D and the foaming process detailed above. The tin catalyst and flame retardant concentrations were also varied. The results of these flexible polyether foam preperations, which also contain a flame retardant, are given in TABLE X below.

TABLE X

| Run Number | Surfactant I | | | | | | | | Surfactant A | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Stannous Octoate, (php) | 0.20 | 0.20 | 0.20 | 0.15 | 0.25 | 0.15 | 0.15 | 0.15 | 0.175 | 0.20 | 0.25 | 0.20 | 0.175 | 0.15 | 0.15 |
| Surfactant, (php) | 1.50 | 0.70 | 0.70 | 1.50 | 1.50 | 0.70 | 1.5 | 1.5 | 1.5 | 1.5 | 1.5 | 0.70 | 1.5 | 0.70 | 1.5 |
| Flame Retardant (php) | 10.0 | 7.5 | 5.0 | 10.0 | 10.0 | — | 10.0 | 10.0 | 10.0 | 10.0 | 10.0 | 10.0 | 15.0 | 10.0 | 10.0 |
| Cream Time, sec. | 10.0 | 10.0 | 10.0 | 11.0 | 9.0 | 10.0 | 10.0 | 9.0 | 9.0 | 9.0 | 9.0 | 10.0 | 10.0 | 10.0 | 10.0 |
| Rise Time, sec. | 95.0 | 87.0 | 83.0 | 105.0 | 86.0 | 82.0 | 86.0 | 92.0 | 97.0 | 94.0 | 87.0 | 93.0 | 112.0 | 84.0 | 88.0 |
| Top Collapse, in. | 0.0 | 0.0 | 0.0 | 4.0 | 0.0 | 0.4 | 0.05 | 0.10 | 0.02 | 0.02 | 0.0 | 0.15 | 0.5 | 0.5 | 0.1 |
| Splits | — | — | — | Split | — | Split | — | Split | — | — | — | Split | Split | Split | 4" Split |
| Density, lb/ft³ | 1.61 | 1.58 | 1.57 | 1.61 | 1.58 | 1.53 | 1.50 | 1.71 | 1.59 | 1.61 | 1.64 | — | — | — | — |
| Cells/Inch | 40–50.0 | 40–50.0 | 40–50.0 | 40–50.0 | 40–50.0 | 45–50.0 | 45–50.0 | 45–50.0 | 45–50.0 | 45–50.0 | 45–50.0 | — | — | — | — |
| Nopco Breathability, (scfm) | 4.20 | 4.20 | 3.90 | 4.70 | 2.65 | 5.5 | 5.25 | 4.3 | 4.0 | 2.65 | 1.90 | — | — | — | — |
| Burn Extent, in. | 3.00 | 3.23 | 5.0 | 2.63 | 2.4 | — | — | 4.3 | 5.0 | 4.9 | 2.85 | 3.9 | 2.3 | — | — |
| Burn Time, sec. | 41.0 | 42.67 | 63.67 | 39.67 | 32.67 | — | — | 61.3 | 64.0 | 62.3 | 40.75 | 51.7 | 41.0 | — | — |

The data in TABLE X above, clearly shows that Surfactant 1 of the present invention was superior to control Surfactant A in limiting burning of the foams produced.

Various modifications and variations of this invention will be obvious to a worker skilled in the art and it is to be understood that such modifications and variations are to be included within the purview of this invention and the spirit and scope of the appended claims.

What is claimed is:

1. A polysiloxane-polyoxyalkylene block copolymer having the average formula $$[RSiO3/2]_t(R_2SiO)_w(R(R^1)SiO)_z[(C_nH_{2n}O)_pR^2]_v$$

wherein:

R represents a momovalent hydrocarbon radical having from 1 to 10 carbon atoms;

$R^1$ represents a cyano-substituted radical of the formula $-(O)_aR^3CN$ wherein $R^3$ is a bivalent alkylene radical having from 2 to 6 carbon atoms or a bivalent alkyleneoxyalkylene radical having from 4 to 12 carbon atoms, and $a$ has a value of 0 or 1;

$R^2$ is a monovalent hydrocarbon radical having from 1 to 12 carbon atoms;

$t$ has an average value of about 0.8 to about 4;

$w$ has an average value of about 3 to about 100, $z$ has an average value of about 3 to about 20;

$n$ has a value of from 2 to 4 provided that about 20 to about 65 weight percent of the oxyalkylene units of the polyoxyalkylene chain, $(C_nH_{2n}O)_p$, is constituted of oxyethylene units;

$p$ has an average value such that the average molecular weight of the polyoxyalkylene chain is from about 800 to about 6000, and $v$ has an average value of about 2 to about 4.

2. A copolymer as defined in claim 1, wherein R is a lower alkyl radical, $a$ has a value of 0; $t$ has a value of 0.8 to about 2; $w$ has a value of about 9 to 40; $z$ has a value of about 3 to 15 and the average molecular weight of the polyoxyalkylene chain is from about 800 to 4000.

3. A copolymer as defined in claim 2 wherein the polyoxyalkylene chain is a poly(oxyethylene-oxypropylene) radical.

4. A copolymer as defined in claim 3 wherein the polyoxyalkylene chain comprises a mixture consisting essentially of (a) from about 50 to about 95 percent by weight of low molecular weight poly(oxyethylene-oxypropylene) groups having an average molecular weight of from about 800 to about 3000 and wherein from about 20 to about 65 weight percent of the oxyalkylene groups are oxyethylene, the remainder of the oxyalkylene groups being oxypropylene, and (b) from about 50 to about 5 percent by weight of high molecular weight poly(oxyethylene-oxypropylene) groups having an average molecular weight of from about 1600 to about 6000 and wherein from about 20 to about 65 weight percent of the oxyalkylene groups are oxyethylene, the remainder of the oxyalkylene groups being oxypropylene; provided that said mixture has an average molecular weight no higher than 4000.

5. A copolymer as defined in claim 4, wherein R is a methyl radical, $R^2$ is a n-butyl radical, $R^3$ is $-CH_2CH_2CH_2-$, and the oxyalkylene units of the polyoxyalkylene chain are randomly distributed.

6. A copolymer as defined in claim 1 having the average formula

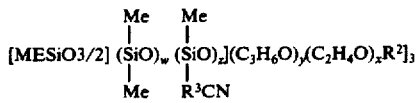

wherein Me is methyl, and $x$ and $y$ have average values such that the average molecular weight of the polyoxyalkylene chain is within the range of about 800 to 6000, and from about 20 to about 65 weight percent of the polyoxyalkylene chain is constituted of oxyethylene.

7. A copolymer as defined in claim 6, wherein $w$ has an average value of about 9 to 40, $z$ has an average value of about 3 to 15; wherein the average molecular weight of the polyoxyalkylene chain is within the range of about 1000 to 4000, $R^3$ is a lower alkylene radical of from 2 to 4 carbon atoms and $R^2$ is a lower alkyl radical of from 1 to 4 carbon atoms.

8. A copolymer as defined in claim 7, wherein the polyoxyalkylene chain comprises a mixture consisting essentially of (a) from about 60 to 90 percent by weight of low molecular weight poly(oxyethylene-oxypropylene) groups having an average molecular weight of from about 1400 to about 2500 and wherein from about 20 to about 65 weight percent of the oxyalkylene groups are oxyethylene, the remainder of the oxyalkylene groups being oxypropylene, and (b) from about 40 to about 10 percent by weight of high molecular poly(oxyethylene-oxypropylene) groups having an average molecular weight from about 2500 to about 3500 and wherein from about 20 to about 65 weight percent of the oxyalkylene groups are oxyethylene, the remainder of the oxyalkylene groups being oxypropylene; provided said mixture has an average molecular weight no higher than 4000.

9. A copolymer as defined in claim 8, wherein $R^2$ is a n-butyl radical and $R^3$ is $-CH_2CH_2CH_2-$ and the oxyalkylene units of the polyoxyalkylene chain are randomly distributed.

10. A copolymer as defined in claim 9, wherein the polyoxyalkylene chain comprises a mixture consisting essentially of about 78 percent by weight of $(C_3H_6O)_{14}(C_2H_4O)_{18.4}C_4H_9$ and about 22 percent by weight of $(C_3H_6O)_{24.3}(C_2H_4O)_{32.1}C_4H_9$.

11. A copolymer as defined in claim 10 having the average formula

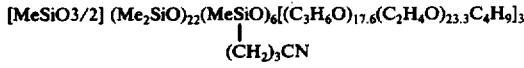

12. A process for producing flexible polyurethane foam, which comprises reacting and foaming a reaction mixture comprising: (a) a polyether polyol reactant containing an average of at least two hydroxyl groups per molecule; (b) a polyisocyanate reactant containing at least two ixocyanato groups per molecule; (c) a blowing agent; (d) a catalyst comprising an amine; and (e) as the foam stabilizer, a polysiloxane-polyoxyalkylene block copolymer as defined in claim 1.

13. A process as defined in claim 12, wherein a flame-retardant is present as an additional component of said reaction mixture.

14. A process as defined in claim 13, wherein water is a source of the blowing action, wherein the catalyst is a tertiary amine and wherein a co-catalyst comprising an organic derivative of tin is present as an additional component of said reaction mixture.

15. A process as defined in claim 14, where in the copolymer foam stabilizer, R is a lower alkyl radical, $a$ has a value of 0; $t$ has a value of 0.8 to about 2; $w$ has a value of about 9 to 40; $z$ has a value of about 3 to 15 and the average molecule weight of the polyoxyalkylene chain is from about 800 to 4000.

16. A process as defined in claim 15, wherein the polyoxyalkylene chain is a poly(oxyethylene-oxypropylene) radical.

17. A process as defined in claim 16 wherein the polyoxyalkylene chain comprises a mixture consisting essentially of (a) from about 50 to about 90 percent by weight of low molecular weight poly(oxyethylene-oxypropylene) groups having an average molecular weight of from about 800 to about 3000 and wherein from about 20 to about 65 weight percent of the oxyalkylene groups are oxyethylene, the remainder of the oxyalkylene groups being oxypropylene, and (b) from about 50 to about 5 percent by weight of high molecular weight poly(oxyethylene-oxypropylene) groups having an average molecular weight of from about 1600 to about 6000 and wherein from about 20 to about 65 weight percent of the oxyalkylene groups are oxyethylene, the remainder of the oxyalkylene groups being oxypropylene; provided that said mixture has an average molecular weight no higher than 4000.

18. A process as defined in claim 17, wherein R is a methyl radical, $R^2$ is a n-butyl radical, $R^3$ is —CH$_2$CH$_2$CH$_2$—, and the oxyalkylene units of the plyoxyalkylene are randomly distributed.

19. A process as defined in claim 14, wherein the copolymer foam stabilizer has the average formula

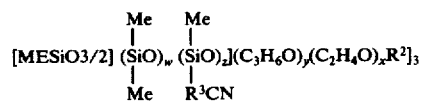

wherein Me is methyl, and $x$ and $y$ have average values such that the average molecular weight of the polyoxyalkylene chain is within the range of about 800 to about 6000, and from about 20 to about 65 weight percent of the plyoxyalkylene chain is substituted of oxyethylene.

20. A process as defined in claim 19, wherein $w$ has an average value of about 9 to about 40, $z$ has an average value of about 3 to 15; wherein the average molecular weight of the polyoxyalkylene chain is within the range of about 1000 to 4000; $R^3$ is a lower alkylene radical of from 2 to about 4 carbon atoms and $R^2$ is a lower alkyl radical of from 1 to 4 carbon atoms.

21. A process as defined in claim 20, wherein the polyoxyalkylene chain comprises a mixture consisting essentially of (a) from about 60 to 90 percent by weight of low molecular weight poly(oxyethylene-oxypropylene) groups having an average molelcular weight of from about 1400 to about 2500 and wherein from about 20 to about 65 weight percent of the oxyalkylene groups are oxyethylene, the remainder of the oxyalkylene groups being oxypropylene, and (b) from about 40 to about 10 percent by weight of high molecular weight poly(oxyethylene-oxypropylene) groups having an average molecular weight from about 2500 to about 3500 and wherein from about 20 to about 65 weight percent of the oxyalkylene groups are oxyethylene, the remainder of the oxyalkylene groups being oxypropylene, provided said mixture has an average molecular weight no higher than 4000.

22. A process as defined in claim 21, wherein $R^2$ is a n-butyl radical and $R^3$ is —CH$_2$CH$_2$CH$_2$— and the oxyalkylene units of the polyoxyalkylene chain are randomly distributed.

23. A process as defined in claim 22, wherein the polyoxyalkylene chain comprises a mixture consisting essentially of about 78 percent by weight of $(C_3H_6O)_{14}(C_2H_4O)_{18.4}C_4H_9$ and about 22 percent by weight of $(C_3H_6O)_{24.3}(C_2H_4O)_{32.1}C_4H_9$.

24. A process as defined in claim 23, wherein the copolymer foam stabilizer has the average formula

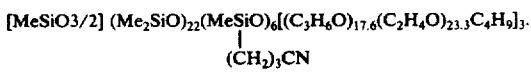

25. A flexible polyether polyurethane foam produced in accordance with claim 12.

26. A flexible polyether polyurethane foam produced in accordance with claim 14.

* * * * *